United States Patent [19]
Snitzer et al.

[11] Patent Number: 4,815,079
[45] Date of Patent: Mar. 21, 1989

[54] OPTICAL FIBER LASERS AND AMPLIFIERS

[75] Inventors: Elias Snitzer, Wellesley; Hong Po, Sherborn; Richard P. Tumminelli, Ashland; Farhad Hakimi, Watertown, all of Mass.

[73] Assignee: Polaroid Corporation, Cambridge, Mass.

[21] Appl. No.: 134,357

[22] Filed: Dec. 17, 1987

[51] Int. Cl.⁴ .............................................. G01S 3/30
[52] U.S. Cl. ..................................... 372/6; 350/96.33
[58] Field of Search .................. 372/6, 39, 40, 71, 75; 350/96.15, 96.19, 311, 315, 96.3, 96.33

[56] References Cited

U.S. PATENT DOCUMENTS

| | | | |
|---|---|---|---|
| 3,729,690 | 4/1973 | Snitzer | 331/24.5 |
| 4,125,768 | 11/1978 | Jackson et al. | 350/96.19 |
| 4,546,476 | 10/1985 | Shaw et al. | 372/6 |
| 4,630,889 | 12/1986 | Hicks, Jr. | 350/96.3 |
| 4,709,986 | 12/1987 | Hicks, Jr. | 350/96.33 |

FOREIGN PATENT DOCUMENTS 0149006 11/1981 Japan ................................. 350/96.30

Primary Examiner—William L. Sikes
Assistant Examiner—B. Randolph
Attorney, Agent, or Firm—Francis J. Caufield

[57] ABSTRACT

Apparatus for coupling radiation into a single-mode core of an optical fiber laser has a single-mode core disposed within a relatively large, multimode cladding at a location which is displaced from the center of the cross-section of the cladding. The cladding is surrounded by a further layer to prevent radiation from propagating out of the cladding. In addition, the apparatus preferably has slight bends to enhance the coupling of radiation from the cladding into the single-mode core. A further embodiment has a single-mode fiber laser disposed in a relatively large, multimode, slab cladding which, in turn, is surrounded by another cladding to prevent radiation from propagating out of the large cladding.

31 Claims, 2 Drawing Sheets

OPTICAL FIBER LASERS AND AMPLIFIERS

BACKGROUND OF THE INVENTION

1. Technical Field of the Invention

The present invention pertains to apparatus for coupling radiation into the core of an optical fiber and, in particular, to apparatus for coupling pump radiation into the core of a laser oscillator or laser amplifier optical fiber.

2. Discussion of the Prior Art

In recent years, optical laser oscillators and amplifiers in an active fiber form have received increasing attention. This is because such active fiber devices combine the excellent properties of standard laser materials with the high energy confinement available in optical fibers. In particular, the round geometry of certain single-mode fibers has been adapted to fiber system applications. Such fibers exhibit large energy conversion efficiencies and excellent coupling properties to single-mode optical transmission fibers and, therefore, have important applications in fiber transmission systems and networks.

Device performance of a fiber laser device, as in any active or nonlinear waveguide, is intimately related to the efficiency with which pump radiation can be absorbed by the active material and, in particular, the active material in the fiber core. Specifically, U.S. Pat. No. 3,729,690, issued on Apr. 24, 1973, discloses a fiber configuration in FIG. 11 which is directed towards promoting efficient coupling of radiation into an active core.

The disclosed fiber configuration is described as follows at col. 17, l. 59 through col. 18, l. 8:

> A laser component or rod of a geometry quite similar to that shown in FIG. 6 can be obtained by having a single small diameter laser fiber 130 placed eccentrically relative to its cladding glass 132 as indicated in FIG. 11. Both the geometry shown in FIG. 11 and the geometry shown in FIG. 6 are of importance in pumping arrangements in which the pumping light enters the rod through the end of the rod from substantially all directions. A principal advantage of these geometries, when used with end pumping light, is that the skew rays internally propagated down the rod are more readily intercepted by the laser element than would be the case if the active laser glass were in the center of the rod. The precise positioning of the active laser fiber 130 relative to the axis of the cladding rod 132 and their relative transverse dimensions are a matter of detail design considerations, depending upon the end results desired.

The above-described fiber configuration specifically relates to relatively short, glass fibers that were well known in the art at the time the patent was filed on Nov. 17, 1969. For that reason, the large radiation losses resulting from the radiation that scattered out of the cladding due to dirt, moisture or other inhomogeneities on the fiber surface in that fiber configuration were not important. However, that configuration is inappropriate for use with the relatively long fibers that are used today due to the large radiation losses which would result therefrom. The longer fibers used today result from the availability of low loss fibers, such as those used for telecommunications.

A further fiber configuration which is directed towards promoting efficient coupling of radiation into an active core is disclosed in U.S. Pat. No. 4,546,476 which issued on Oct. 8, 1985. The disclosed fiber configuration comprises a side-by-side arrangement of a pair of optical fibers, the first fiber providing a means for receiving pumping radiation and the second fiber being doped with an active, lasing material. The refractive indices of the first and second fibers are selected so that radiation is guided in the second, active fiber whereas pumping radiation in the first fiber is unguided. The indices of refraction were so chosen to promote transfer of pumping radiation from the first fiber to the second, active fiber. As shown in FIG. 2 of the patent, the cross-sectional area of the second active fiber 14 forms a substantial portion of the cross-sectional area of the side-by-side configuration. Specifically, the patent states at col. 3, l. 31–38: "If the diameter of the jacket is only slightly larger than the fiber diameters, a significant portion of the pumping illumination refracted from the pumping fiber will be absorbed in the ND:YAG crystal fiber, resulting in a high energy density and thus a high inversion ratio within the ND:YAG crystal fiber to provide amplification of the optical signal which it transmits." Further, the patent discloses the use of a thin cladding as follows at col. 5, l. 45–49: "For this reason, it will be understood that it is advantageous to maintain the envelope size of the jacket 22 as small as possible to minimize absorption by the jacket 22 and to thereby maximize absorption in the ND:YAG fiber 14." Thus, for comparable indices of refraction for the first core, second core and jacket, the number of modes of radiation which are received by the combination of first fiber and jacket, which number is proportional to the cross-sectional area of the first fiber and jacket, is approximately the same as the number of modes which could have been coupled directly into the active core because the cross-sectional areas are similiar in size. As a result, no advantage is obtained from this fiber configuration from the ratio of the area of the combined first fiber and jacket to the area of the second fiber.

In addition to the above, the patent is not directed to coupling radiation into an active, single-mode core, i.e., the patent discloses, at col. 4, l. 50–51, that second, active fiber 14 has a core with a diameter of 100 microns. Further, an embodiment wherein the cladding or core of each of the fibers is polished to form substantially planar surfaces which are disposed adjacent to each other to promote coupling does not solve the above-identified problems.

As a result, there is a need in the art for a fiber structure containing a single-mode core which will efficiently receive a substantial portion of the radiation output by a pump source such as a laser diode, and which, after receiving that radiation, will efficiently couple that radiation into the single-mode core.

SUMMARY OF THE INVENTION

Embodiments of the present invention advantageously solve the above-described problems in the prior art by providing a fiber structure which: (1) contains a single-mode core; (2) efficiently receives a large portion of incident pump radiation; and (3) couples a substantial portion of that radiation into the single-mode core.

In a first, preferred embodiment of the present invention, an active core, for example, an Nd-doped, fused silica, single-mode core is disposed within a first, multi-mode cladding layer of fused silica which has a substantially circular cross-section. The ratio of the diameter of the first, multimode cladding to the diameter of the single-mode core is substantially in the range between ten-twenty to one. Further, the multimode cladding is surrounded by a relatively thin layer of fluorine or boron doped silica and, in turn, the relatively thin layer of fluorine or boron doped silica may optionally be surrounded by another layer of silica. Still further, the single-mode core is displaced from the center of the first, multimode cladding layer. The amount of the displacement is determined by the condition that a substantial amount of radiation propagating in the first, multimode cladding couple into the single-mode core. This coupling occurs whenever the radiation propagating in the multimode cladding passes through the single-mode core at the displaced position and is absorbed therein.

In addition, slight bends in the fiber structure provide perturbations in the modes propagating in the multimode cladding. These perturbations cause radiation from cladding modes which would not ordinarily pass through the single-mode core to couple into other cladding modes which pass through the position occupied by the single-mode core. As a result, substantially all of the energy input into the multimode cladding of this bent fiber may be absorbed by the single-mode core. Further, as a result of the fact that the first cladding of the inventive fiber is a multimode structure, one can advantageously couple radiation thereinto without requiring the high tolerances which are normally required for coupling light from, for example, a laser diode pump, directly into a single-mode core. Additionally, because a source of pump radiation can now be focused into the multimode cladding of the inventive fiber instead of the single-mode core, the saturation effects caused by the high intensity of the pump radiation coupled into the single-mode core are substantially reduced.

The NA for the first, multimode cladding of the preferred embodiment should be substantially in the range of 0.05 to 0.12 to ensure that the multimode cladding has a large enough acceptance angle to provide, along with its large cross-section, efficient radiation capture. Further, in the preferred embodiment, the diameter of the first cladding of the inventive fiber should be 5 to 20 microns greater than the junction length of a pump laser diode to relieve high tolerance lateral positioning requirements. As a consequence of this, the transfer of radiation between the pump and the first cladding is so efficient that the mode structure of the pump laser diode is unimportant. In fact, we have achieved laser action by pumping an inventive fiber having a Nd-doped, fused silica core with a zenon arc lamp.

Further, the diameter of the single-mode, active core of a preferred embodiment which contains active laser material, such as, for example, $Nd^{3+}$ ions, should have a V-value at 1.06 microns of 2.0 to 2.2. In any case, the V-value of the core should be kept below 2.405, the value for single-mode cutoff. In fact, the V-value of the core should not be too close to the V-value for single-mode cutoff to preclude the erratic behavior that can exist as a result of simultaneous multimode and single-mode transmission along the length of the active core in the event of fluctuations in the core diameter which were introduced during manufacture of the fiber.

A thin layer of fluorine or boron doped silica provides a means for trapping radiation in the multimode cladding. This thin layer prevents radiation from escaping through the sides of the multimode cladding and solves a problem which occurs from use of the structure disclosed in FIG. 11 of U.S. Pat. No. 3,729,690, which structure has been discussed above. As is well known in the art, the fluorine or boron doping of the silica depresses the index of refraction and, thereby, causes radiation to be trapped in the first, multimode cladding. Furthermore, it protects the entire surface of the first cladding from scattering inhomogeneities such as dust or moisture droplets.

A second embodiment of the present invention for providing efficient coupling of radiation into a single-mode core comprises an elongated slab structure. In this embodiment, an active single-mode core is disposed substantially in the center of an elongated, multi-mode, fused silica slab cladding which preferably has a rectangular cross-section. The dimensions of the rectangular slab are preferably such that the width and height thereof exceed those of the junction of a pump laser diode used to provide pump radiation. The multimode, rectangular, slab cladding efficiently receives radiation from a pump source and, in turn, causes efficient coupling therefrom into the single-mode core. The slab cladding is further surrounded by a low index material such as, for example, a clear hard plastic having an index of refraction on the order of, for example, 1.39. It is advantageous to surround the slab cladding with plastic because plastic is sufficiently flexible that it will not break when the fiber is bent. The index of refraction relationship for this structure is: the index of refraction, $n_1$, of the single-mode core is greater than the index of refraction, $n_2$, of the multimode, slab cladding which, in turn, is greater than the index of refraction, $n_3$, of the surrounding material. With the first cladding made from fused silica, the NA for the multimode, first cladding relative to the second cladding made of low index plastic can be as high as 0.4.

This second preferred embodiment may be end pumped, for example, by a laser diode. In this configuration, the pump radiation may advantageously be coupled into the cladding without being focused with high precision. This is advantageous because, as compared with pumping directly into the core, it allows one to use a lower brightness multimode pump. Furthermore, with an NA as high as 0.4, and for large enough dimensions for the rectangular first cladding, substantially all of the light from a laser diode, neglecting interface Fresnel reflection loss, could be absorbed without even using a lens, i.e., simply by placing the end of the fiber opposite and close to the laser diode emitting area. For example, laser diodes are available with an effective emitting area of two microns by 100 microns and with a multimode power output of several hundred milliwatts. Typical values for the full width for the beam spread for the laser diode emission in the plane containing the long dimension of the emitting area and in the one orthogonal to it are 15° and 30°, respectively. For a fiber with an NA of 0.4 and rectangular dimensions of 40 microns by 120 microns and placed 5 microns from the laser diode emitting area, substantially all of the laser diode light is readily collected by the first cladding with comfortable lateral tolerances on the position of the fiber relative to the laser diode emitting surface.

In a third embodiment of the present invention, the slab structure described above is configured for side coupling of light into the slab cladding in several different ways. For example, a first method for side coupling entails exposing the slab cladding for two fibers by, for example, dissolving or otherwise removing a portion of the plastic material surrounding the slab cladding. One of these fibers has a single-mode laser core disposed therein, and the other does not contain a core disposed therein. The latter is like the first cladding of the laser fiber but is equal to or preferably smaller in area. The exposed sections of the slab cladding are then affixed together for both fibers.

In this embodiment, the fiber without the active core may be end pumped. As a result, when the end pumped radiation reaches the position where the two exposed slabs are affixed together, the radiation will couple from one slab to the other. As is well known to those of ordinary skill in the art, if a cement is used to affix the two slabs, the cement should have a higher index of refraction than either of the slabs so that radiation will couple from one slab into the second slab. The coupling region is then reclad with the low index plastic material to protect the fiber surfaces from scattering inhomogeneities.

Further embodiments using this configuration comprise several slab-to-slab configurations disposed at various positions along the length of the fiber containing the active, single-mode core. In such embodiments, radiation may be coupled from more than one pump source into the side of the slab cladding containing the active core and in both directions along the laser fiber.

A second method for side coupling entails exposing the slab cladding of a fiber by, for example, removing a portion of the plastic material surrounding the slab cladding, at various locations along the fiber. Prisms are then affixed to the exposed sections of the slab with index-matching materials. For the proper direction of incidence of a collimated beam, radiation which impinges upon one face of a prism will couple therefrom into the slab cladding. Further, this radiation which is coupled into the slab cladding will, in turn, couple, as described above, into the single-mode active core. This advantageously provides another embodiment of the present invention for side pumping the active, single-mode core with radiation from a multiplicity of pumps.

A third method for side coupling entails using a rectangular fiber similar to the first cladding of the laser fiber but without a laser core contained therein, which rectangular fiber is also clad with a low index of refraction clear plastic. One end of the fiber is ground and polished at a steep angle substantially in the range of, for example, 5° to 20°, to provide a tapered end surface which is affixed to the slab in a similar manner to the methods described above. The other end of this pump feed fiber has pump light coupled into it as previously described.

The advantage of the above-described embodiments of the present invention is that pump radiation may be focused imprecisely into a multimode cladding wherein it undergoes a multiplicity of reflections and passes back and forth through a single-mode core many times until all of this radiation is absorbed by the core. It is estimated that a meter or a few meters would be an appropriate length for efficient absorption of pump radiation in the core in most cases. Further, in these embodiments, the fiber may be wrapped into a coil if the length requirements are longer than one meter and compactness is desired.

BRIEF DESCRIPTION OF THE DRAWINGS

The principles of the present invention may be clearly understood by considering the following detailed description in conjunction with the accompanying drawing, in which.

To facilitate understanding, identical reference numerals have been used to denote identical elements common to the figures.

DETAILED DESCRIPTION

Figure 1:
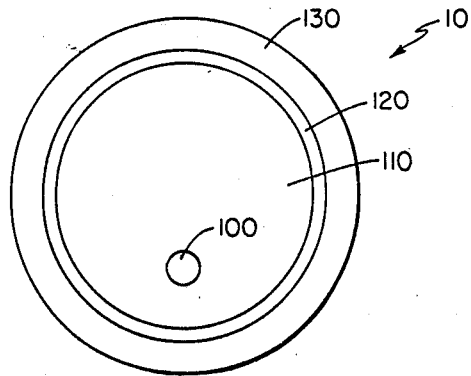
FIG. 1 shows, in pictorial form, a cross-section of a first embodiment of the present invention.

FIG. 1 shows, in pictorial form, a cross-section of a first embodiment 10 of the present invention. Single-mode core 100 has an index of refraction $n_1$ and may be fabricated, for example, as a Nd3+ ion-doped, fused silica core. First cladding layer 110 has an index of refraction $n_2$ and is a multimode cladding fabricated, for example, from fused silica. Core 100 is displaced from the center of first cladding layer 110. Second cladding layer 120 surrounds cladding 110 and has an index of refraction $n_3$ which is lower than index of refraction $n_2$ of silica cladding 110. The index of refraction of layer 120 may be lowered from that of cladding 110 by any method known in the art such as, for example, depositing silica on a preform in the presence of fluorine or $B_2O_3$ or both. Second cladding layer 120 is, in turn, surrounded by a cladding layer 130 formed from, for example, fused silica. Cladding 130 is provided as a matter of convenience and is not essential to the operation of the inventive apparatus.

Fiber 10 shown in FIG. 1 is different from the structure disclosed in FIG. 11 of U.S. Pat. No. 3,729,690 and discussed in the Background of the Invention. The difference is that second cladding layer 120 of the inventive structure is not included in the structure disclosed in FIG. 11 of the patent. The patent was concerned with relatively short lengths of fiber and for that reason the losses associated with the interface between its cladding and the air were not significant. However, when the length of a fiber approaches one meter, as is the case with fibers fabricated in accordance with the present invention, there is a need to prevent scattering losses due to propagation of light out of cladding 110 by dirt, moisture or other inhomogeneities on the surface.

A preferred embodiment of the fiber structure shown in FIG. 1 for use with a Nd3+ ion-doped, single-mode core having additional impurities such as aluminum, germanium, or phosphorus has the diameter of multimode cladding 110 being substantially in the range of 40 to 80 microns and the diameter of single-mode core 100 being substantially in the range of 3 to 8 microns.

The number of modes that can propagate in a multimode waveguide having a substantially circular cross-section, is equal to V2/2, where V is given by:

$$V = \pi d[n_{guide}^2 - n_{clad}^2]^{\frac{1}{2}} / l_{pump} \quad (1)$$

where d is the diameter of the waveguide, $n_{guide}$ is the index of refraction of the waveguide, $n_{clad}$ is the index of refraction of the cladding, and $l_{pump}$ is the wavelength of the radiation coupled into the waveguide.

Using eqn. (1), the number of modes propagating in multimode cladding 110 of the inventive fiber is given by:

$$2\pi A[n_2^2 - n_3^2]/l_{pump}^2 \qquad (2)$$

where A is the cross-sectional area of cladding 110, $n_2$ is the index of refraction of cladding 110, and $n_3$ is the index of refraction of cladding 120.

Eqn. (2) applies for two states of polarization of the coupled radiation. Thus, for a single-mode core, there are two polarizations for the single propagating mode. Therefore, the number of modes which can be coupled from a pump source into multimode cladding 110 as compared to the number of modes which can be coupled from a pump source directly into core 100 is given by:

$$\pi A[n_2^2 - n_3^2]/l_{pump}^2 \qquad (3)$$

Since the radiation coupled into multimode cladding 110 is eventually absorbed by single-mode core 110, eqn. (3) depicts the substantial improvement obtained by pumping the inventive structure over that provided by pumping radiation directly into a single-mode core. This improvement is obtained in accordance with the present invention because the output from a multimode pump source is coupled into multimode cladding 110, and the radiation coupled thereinto is coupled, in turn, into single-mode core 100.

For example, when using a laser diode pump source having an elongated junction geometry, one should fabricate inventive fiber 10 to have an NA of multimode cladding 110—which NA is determined by the indices of refraction of cladding layer 120 and cladding layer 110—to be substantially in the range of 0.10 to 0.30. This provides a reasonably high NA which is adequate to capture most of the radiation emitted by the laser diode. In addition, this NA is not so high that one encounters fabrication problems associated with stresses which result from the fabrication of a fiber from materials having the highly diverse indices of refraction required to provide the required high NA.

In a preferred embodiment, the NA between core 100 and cladding 110 should be as small as possible, i.e., substantially in the range of 0.02 to 0.15. Further, the diameter of single-mode core 100 which contains an active material such as, for example, Nd3+ ions, should be as large as possible to present a large target area for coupling radiation propagating in cladding 110 thereinto. Thus, single-mode core 100 should have a V-value at typical laser radiation wavelengths substantially in the range of of 2.0 to 2.2. Note that this value should be kept below 2.405, i.e., the value for single-mode cutoff, because one does not want to come too close to the single-mode cutoff value and run the risk of any resulting erratic behavior due to lack of precise diameter control. In addition, the diameter of cladding 110 should be approximately ten to twenty times greater than the diameter of core 100 in order to obtain a high efficiency for coupling radiation into cladding 110 as opposed to coupling radiation directly into core 100. As described above, the coupling efficiency is directly proportional to the ratio of the areas.

We have determined that as much as 90% of the light coupled into cladding 110 can be absorbed in single-mode core 100 with a concentration of 1.0 weight-percent of $Nd_2O_3$, i.e., $10^{20}$ Nd ions/cc in 8 meters when the ratio of the diameter of core 100 to the diameter of cladding 110 is substantially in the range of 1 to 10. This ratio of diameters provides a ratio of the area of cladding 110 to the area of core 100 of 1 to 100. For example, we have fabricated neodymium doped fiber cores having a 5 micron diameter core 100 with an NA of 0.15 relative to first cladding 110 which had a circular cross-section. First cladding 110, in turn, had an NA relative to second cladding 120 of 0.1.

The advantage of displacing core 100 from the center of cladding 110 arises as follows. If core 100 and first cladding 110 were concentric, the efficiency of side pumping core 100 through first cladding 110 would be relatively low because only axial rays would be absorbed for modest fiber bends. However, by displacing core 100 to be within, for example, 5 microns of the edge of first cladding 110, skew rays are more readily absorbed. For example, we fabricated an 8 meter long fiber having an offset core with a 1.0 wt-% neodymium concentration and determined that less than 10% of the pump light coupled into the fiber at 0.806 micrometers was transmitted through the fiber.

Still further, we have discovered that the embodiment shown in FIG. 1 can provide enhanced coupling between radiation propagating in multimode cladding 110 and single-mode core 100 if a mechanism exists for perturbing the modes in cladding 110. Such a means for perturbing the modes is provided by introducing slight bends in fiber 10. The perturbation introduced by the bends causes coupling between the modes of cladding 110. As a result, more radiation is coupled into single-mode core 100 from more of the modes propagating in cladding 110. However, since bends also scatter light out of the fiber, the bending introduced to promote coupling should be slight bending.

The inventive embodiment disclosed above may be fabricated in accordance with methods well known in the art such as modified chemical vapor deposition, i.e., MCVD. In such a process, a small core is formed inside a larger cladding, and a preform is created therefrom with a cladding to core diameter ratio of 20 to 40. Then, the preform resulting from this MCVD process is ground and polished to provide the off-center position of core 100 within cladding 110. Separately, a fused silica tube has a partially fluorinated layer of $SiO_2$ deposited on its inner surface by the MCVD process. The off-center core-cladding preform is then inserted into the tube, and the tube is fused to the inserted preform to form a final preform. Because it contains fluorine, the index of refraction of thin layer 120 is lower than that of layer 110 and, thereby, layer 120 provides a confinement layer for radiation propagating within multimode cladding 110. Finally, an inventive optical fiber is drawn from the final preform in a manner which is well known in the art. In an alternative embodiment of the above-described embodiment, instead of fabricating a fluorinated silica layer 120 which surrounds multimode cladding 110, one may fabricate a boron-doped silica layer 120 as well.

If we denote the index of refraction of single-mode core 100 by $n_1$, the index of refraction of multimode cladding 110 by $n_2$, the index of refraction of fluorinated silica layer 120 by $n_3$, and the index of refraction of second silica layer 130 by $n_4$, we have the following relationship among the indices of refraction:

$n_1 > n_2 > n_3$ and $n_4 = n_2$ (4)

Figure 2:
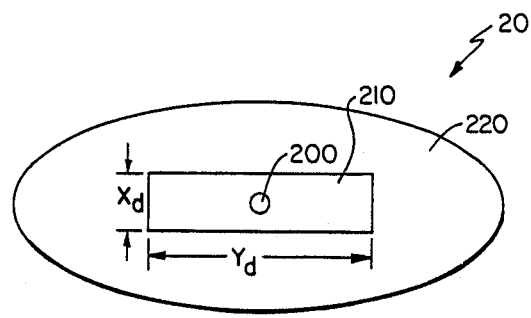
FIG. 2 shows, in pictorial form, a cross-section of a second embodiment of the present invention.

FIG. 2 shows, in pictorial form, a cross-section of a second embodiment 20 of the present invention. Single-mode core 200 has an index of refraction $n_1$ and may be fabricated, for example, as a $Nd^{3+}$ ion-doped fused silica core. Slab cladding layer 210 has an index of refraction $n_2$, is a multimode cladding fabricated, for example, from fused silica, and preferably has a substantially rectangular cross-section. Second cladding layer 220 surrounds cladding 210 and has an index of refraction $n_3$ which is lower than index of refraction $n_2$ of silica cladding 210. As such, cladding 220 provides a means for preventing the loss of radiation which propagates in multimode cladding 210. Cladding 220 is preferably fabricated from a hard plastic such as, for example, a fluorinated polymer, which is a hard, clear plastic having a low index of refraction. For example, $n_3$ is approximately equal to 1.39. It is advantageous to fabricate cladding 220 from plastic because plastic is flexible and it does not stress cladding 210 when fiber 20 is bent. Furthermore, the index of refraction $n_3$ can be made lower with a plastic than by fluorine or boron doping $SiO_2$, thereby increasing the acceptance angle for pump radiation.

In an analogous manner to that described above for embodiment 10, the ratio of the number of modes trapped in multimode cladding 210 to the number of modes trapped in single-mode core 200 is determined by the ratio of the cross-sectional area of cladding 210 to the cross-sectional area of core 200 and the square of the NA for the multimode fiber formed between region 210 and 220. As described above, it is preferable that this area ratio be substantially in the range of 50–400 to 1, although other values would function properly, albeit, less efficiently. Thus, if the diameter of core 100 is denoted by d and, as shown in FIG. 2, the height of cladding 220 is given by $x_d$ and the width by $y_d$, then it is desirable that xy be substantially in the range of 50 to 400. Thus, preferred embodiments of the inventive fiber would have dimensions such that $2 < x_x < 5$ and $5 < y_d < 100$.

Fibers fabricated in accordance with the second embodiment may be end pumped with radiation and, in particular, such embodiments are advantageous for end pumping with laser diodes which typically have rectangularly shaped junctions.

It should be clear to those of ordinary skill in the art that the shape of cladding 210 need not necessarily be rectangular and that any of a large number of shapes having substantially different width and height are also within the spirit of the present invention.

In fabricating embodiments of the present invention for use in lasers, the higher the concentration of absorbing laser ions that are contained per unit length in the core, the stronger the absorption and, hence, the shorter the fiber can be made for nearly complete pump absorption. Thus, a large core diameter is advantageous as long as it has a small enough NA so as to still give a V-value which is less than 2.405.

Further, when one uses prior art embodiments to end pump directly into a neodymium core, one uses $Nd^{3+}$ concentrations in the range of $10^{17}$ to $10^{20}$ ions/cc. This is because higher concentrations tend, in high silica, low-loss glasses, to give concentration quenching. However, when one uses embodiments of the present invention to side pump through a first cladding, one can tolerate some concentration quenching and, therefore, values of $Nd^{3+}$ concentrations up to $5 \times 10^{20}$ ions/cc could be used. As a result, the fiber lengths needed to absorb most of the pump power would be correspondingly reduced or the area of the first cladding correspondingly increased for the same absorption per unit length. The inventive method of pumping through a first cladding is especially effective where absorption in the core occurs in one ion and there is a subsequent energy transfer to a second ion which lases. For example, erbium ($Er^{3+}$) can be made to lase at 1.54 microns quite readily by co-doping with ytterbium ($Yb^{3+}$). In such a fiber, typical concentration ratios are $15 \times 10^{20}$ $Yb^{3+}$ ions/cc and $0.3 \times 10^{20}$ $Er^{3+}$ ions/cc. With such a high $Yb^{3+}$ concentration, there is strong absorption in the wavelength region of 0.92 to 0.98 microns. Similarly, co-doping with $Nd^{3+}$ and $Yb^{3+}$ gives strong absorption by $Nd^{3+}$ followed by efficient energy transfer to $Yb^{3+}$ which can lase at 1.02 microns or 1.06 microns.

The embodiment shown in FIG. 2 may be fabricated in accordance with methods well known in the art, such as MCVD. In such a process, a high index of refraction laser core is formed inside a cladding to create a preform. Then, the preform is ground and polished to provide a final preform having the shape of slab cladding 210 shown in FIG. 2. Finally, an inventive optical fiber is drawn from the final preform in a manner which is well known in the art in which clear plastic is applied as a buffer coat immediately after the fiber leaves the drawing furnace.

For example, it has been found that for an 8 micron diameter core containing $10^{20}$ trivalent neodymium ($Nd^{3+}$) ions per cubic centimeter within a first cladding of rectangular shape whose dimensions were 115 microns by 40 microns and with the core centered in the long dimension and off-center in the short dimension so that its edge was 8 microns from the edge of the rectangle and with a clear plastic for a second cladding with an index of refraction of 1.39, the absorption at the wavelength of 0.806 microns was 4 dB/meter. Hence, for this fiber, 90% of the pump light was absorbed in 2.5 meters. This absorption value is approximately 75% of what would result if the neodymium in the core were uniformly dispersed in the second cladding. For a circular second cladding whose diameter is ten times that of a single-mode core containing the same ion concentration and diameter as above and with the edge of the core 6 microns from the edge of the first cladding, the absorption was 27% of what it would be if the ions were uniformly dispersed in the first cladding.

Figure 3:
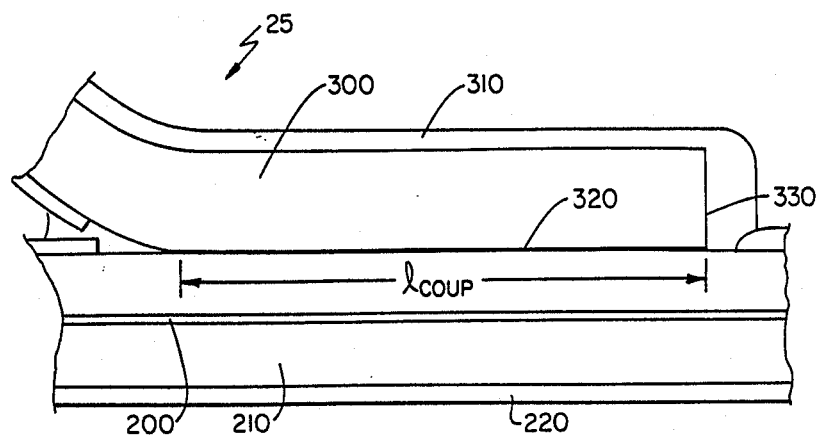
FIG. 3 shows, in pictorial form, a lengthwise cross-section of a first embodiment of the present invention which provides side pumping.

A still further embodiment of the present invention is shown in FIG. 3 which utilizes fiber 20 shown in FIG. 2 and advantageously provides side pumping. The embodiment shown in FIG. 3 is formed by first fabricating fiber 20 shown in FIG. 2. Then, a second fiber 25 is formed. Fiber 25 is like fiber 20 but does not have a core, i.e., cladding 300 and cladding 310 of fiber 25 are like cladding 210 and cladding 220 of fiber 20. Then, cladding 210 is exposed for a length $l_{coup}$ by, for example, dissolving a portion of cladding 220 away from fiber 20 and cladding 300 is exposed for a length $l_{coup}$ by, for example, dissolving a portion of cladding 310 away from fiber 25. Finally, fibers 20 and 25 are affixed to each other so that the exposed portion of cladding 220 and the exposed portion of cladding 300 are disposed adjacent each other along substantially the full length $l_{coup}$ by affixing material 320. If the index of refraction of cladding 210 is denoted by $n_1$, the index of refraction of cladding 300 is denoted by $n_2$, the index of refraction of second cladding 220 is denoted by $n_3$, and the index of refraction of affixing material 320 is denoted by $n_c$, then in order that radiation couple from cladding 300 into cladding 210:

$$n_1 > n_3; \quad n_1 > n_2 > n_3; \text{ and } n_c > n_1 \quad (5)$$

As one can readily appreciate from FIG. 3, this embodiment provides for side pumping of radiation into cladding 210, which radiation was end pumped into cladding 300. Length $l_{coup}$ is chosen to be sufficiently long that a substantial portion of the radiation propagating in cladding 300 will couple from cladding 300 into cladding 210. Alternatively, a short length can be used but the cross-sectional area of cladding 300 should be substantially less than that of cladding 210. The region of the coupler can then be covered with a low index of refraction plastic to protect the surfaces from scattering due to dust or moisture droplets.

In FIG. 3, if the index of refraction $n_2$ for cladding 300 is set equal to the index of refraction $n_1$ for cladding 210, the rate of absorption per unit length by core 200 as compared with the rate of absorption for end pumping core 210 only, without the presence of fiber 25, is reduced in the ratio of $A1/(A1+A2)$, where A1 is the cross-sectional area of cladding 210 and A2 is the cross-sectional area of cladding 300. The light which arrives at the end of the coupling length $l_{coup}$ will be partially in cladding 300 and partially coupled into cladding 210. For coupling lengths in excess of just ten times or so of the slab width, the fraction of light arriving at the end of coupler length $l_{coup}$ that is coupled into cladding 210 is given by $A1/(A1+A2)$. For this reason, it is desirable to make the area A2 smaller than A1, but still large enough to permit efficient coupling of laser diode light into its entrance end. Furthermore, if surface 330 is a well prepared cleaved or polished surface with a high reflector placed on it by evaporation or other means, the fraction $A2/(A1+A2)$ of light which does not couple into cladding 210 after one pass can be made to traverse the coupling region in the reverse direction to experience a coupling to the core 200 again and then to have a fraction $A1/(A1+A2)$ that arrives back at the start of the coupling length and be coupled into cladding 210 but propagating in the opposite direction. If C is the fraction of light that enters the coupling region that is absorbed by the core 200 and R is the reflectivity of the reflector on the end surface 330, the total fraction of incident pump light coupled from fiber 25 to fiber 20 is given by:

$$[C+(1-C)A1/(A1+A2)][1+R(1-C)A2/(A1+A2)] \quad (6)$$

This result neglects scattering losses which, if the fibers are handled properly, will be small.

If the coupling length $l_{coup}$ is made short so that C approaches zero and the reflectivity R is taken equal to 1, neglecting scattering losses, the fraction of pump light coupled into fiber 20 is given by:

$$[A1/(A1+A2)][1+A2/(A1+A2)] \quad (7)$$

If the areas A1 and A2 are equal, the coupling efficiency is 75%. If A2 equals A1/2, the coupling efficiency is increased to 89%.

Figure 4:
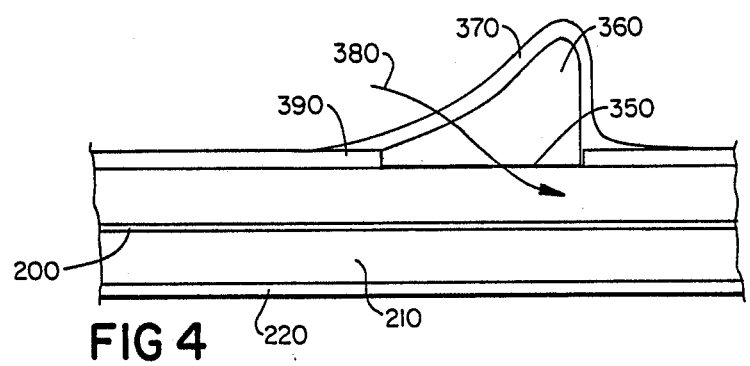
FIG. 4 shows, in pictorial form, a lengthwise cross-section of a second embodiment of the present invention which provides side pumping.

FIG. 4 shows a still further embodiment of the present invention which utilizes fiber 20 shown in FIG. 2 and advantageously provides side pumping. The embodiment shown in FIG. 4 is formed by first fabricating fiber 20 shown in FIG. 2. Then, a portion of cladding 210 is exposed by, for example, dissolving a small length of cladding 220 away from fiber 20. Finally, prism or tapered wedge 360 is affixed to the exposed portion of cladding 210 by use, for example, of an appropriate index-matching material 350, such as index-matching oil. In operation, radiation which impinges upon face 370 of wedge 360 is coupled into cladding 210 to provide side pumping thereof. Wedge 360 may be fabricated from glass or any clear plastic, preferably with a high index of refraction to facilitate pump light 380 being coupled into cladding 210. The region of the coupler can then be covered with a low index of refraction plastic to protect the surfaces from scattering due to dust or moisture droplets.

Figure 5:
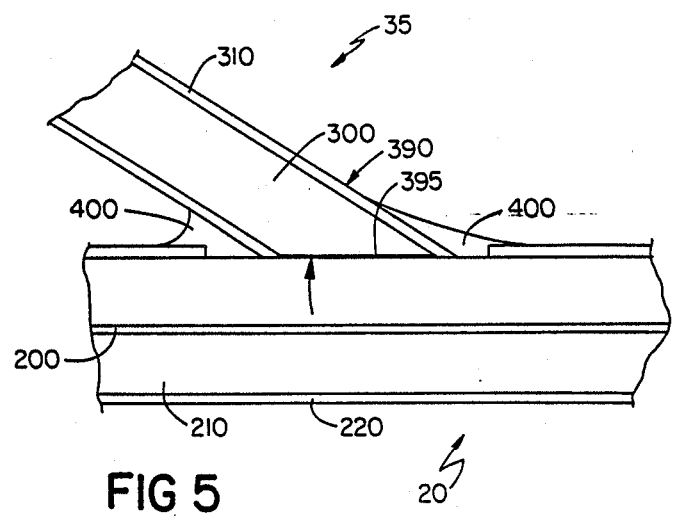
FIG. 5 shows, in pictorial form, a lengthwise cross-section of a third embodiment of the present invention which provides side pumping.

FIG. 5 shows another embodiment of the present invention. As in FIG. 3, a side coupler fiber 35 is attached for end pumping by a laser diode; however, the end of fiber 35 is tapered to form a wedge, angle 390 of the wedge being substantially in the range of 5° to 20°. Side coupling fiber 35 is bonded with material 395 that has an index of refraction $n_c > n_1$. Low index plastic material 400 is shown surrounding the coupling region.

Further, it should be clear that, although FIGS. 3–5 show coupling by a single fiber or wedge side coupler, further side coupling may be provided by a multiplicity of such second fibers and/or wedges.

Although particular embodiments of the present invention have been shown and described herein, many varied embodiments incorporating the teachings of the present invention may be easily constructed by those skilled in the art.

What is claimed is:

1. An optical fiber which comprises:
   a substantially single-mode core having an index of refraction $n_1$ comprised of laser material disposed within a multi-mode cladding having an index of refraction $n_2$; and
   a further cladding having an index of refraction $n_3$ surrounding said multi-mode cladding with substantially no space between said further cladding and said multi-mode cladding;
   wherein said single-mode core is disposed at an offset from the geometric center of said multi-mode cladding and $n_1 > n_2 > n_3$.

2. The optical fiber of claim 1 wherein said fiber has bends disposed along its length.

3. The optical fiber of claim 2 wherein said cross-sectional area of the multimode cladding is substantially larger than the cross-sectional area of said single-mode core.

4. The optical fiber of claim 3 wherein said cross-sectional area of the multimode cladding is substantially in the range of 50 to 400 times larger than the cross-sectional area of said single-mode core.

5. An optical fiber which comprises:
   a substantially single-mode core having an index of refraction $n_1$ comprised of laser material disposed within a multi-mode cladding having an index of refraction $n_2$; and
   a further cladding having an index of refraction n, surrounding said multi-mode cladding with substantially no space between said further cladding and said multi-mode cladding;

wherein the cross-sectional area of said multi-mode cladding taken substantially transverse to the axial extent of the optical fiber has a first path across said area which passes substantially through the geometric center thereof whose length is substantially different from the length of a second path across said area which passes substantially through the geometric center thereof, said second path being substantially perpendicular to said first path and $n_1 > n_2 > n_3$.

6. The optical fiber of claim 5 wherein the cross-sectional area of said multimode cladding substantially forms a rectangle.

7. The optical fiber of claim 6 wherein said single-mode core is disposed substantially at the geometric center of said multimode cladding.

8. The optical fiber of claim 5 wherein said fiber has bends disposed along its length.

9. The optical fiber of claim 8 wherein the cross-sectional area of said multimode cladding is substantially larger than the cross-sectional area of the single-mode core.

10. The optical fiber of claim 9 wherein the cross-sectional area of said multimode core is substantially in the range of 50 to 400 times larger than the area of the single-mode core.

11. An apparatus comprising:
a first fiber which comprises a substantially single-mode core having an index of refraction $n_1$ comprised of laser material disposed within a multi-mode cladding having an index of refraction $n_2$ and a further cladding having an index of refraction $n_3$, surrounding said multi-mode cladding with substantially no space between said further cladding and said multi-mode cladding;
wherein the cross-sectional area of said multi-mode cladding taken substantially transverse to the axial extent of the first fiber has a first path across said area which passes substantially through the geometric center thereof whose length is substantially different from the length of a second path across said area which passes substantially through the geometric center thereof, said second path being substantially perpendicular to said first path, said further cladding does not completely surround said multi-mode cladding along at least one portion of the axial extent of said first fiber, and ps
$n_1 > n_2 > n_3$; and a second fiber which comprises a multi-mode waveguide and another further cladding surrounding said multi-mode waveguide with substantially no space between the another further cladding and the multi-mode waveguide;
wherein the cross-sectional area of said multi-mode waveguide taken substantially transverse to the axial extent of said second fiber has a first path across said area which passes substantially through the geometric center thereof whose length is substantially different from the length of a second path across said area which passes substantially through the geometric center thereof, said second path being substantially perpendicular to said first path, said another further cladding does not completely surround said multi-mode waveguide along at least one portion of the axial extent of said second fiber; and said multi-mode cladding is affixed to said waveguide along at least one of the at least one portion of the first and second fibers.

12. An apparatus comprising:
a fiber which comprises a substantially single-mode core having an index of refraction $n_1$ comprised of laser material disposed within a multi-mode cladding having an index of refraction $n_2$ and a further cladding having an index of refraction $n_3$ surrounding said multi-mode cladding with substantially no space between said further cladding and said multi-mode cladding;
wherein the cross-sectional area of said multi-mode cladding taken substantially transverse to the axial extent of the fiber has a first path across said area which passes substantially through the geometric center thereof whose length is substantially different from the length of a second path across said area which passes substantially through the geometric center thereof, said second path being substantially perpendicular to said first path, said further cladding does not completely surround said multi-mode cladding along at least one portion of the axial extent of said fiber, and $n_1 > n_2 > n_3$; and at least one coupling means is affixed to said multi-mode cladding along at least one of the at least one portion of said first fiber for coupling radiation into said multi-mode cladding.

13. The apparatus of claim 12 wherein said coupling means is a prism.

14. The apparatus of claim 12 wherein said coupling means is a wedge.

15. The optical fiber of claim 1 wherein said laser material comprises Nd3+ having concentrations substantially in the range of $0.5 \times 10^{20}$ ions/cc to $5 \times 10^{20}$ ions/cc.

16. The optical fiber of claim 5 wherein said laser material comprises Nd3+ having concentrations substantially in the range of $0.5 \times 10^{20}$ ions/cc to $5 \times 10^{20}$ ions/cc.

17. The apparatus of claim 11 wherein said laser material comprises Nd3+ having concentrations substantially in the range of $0.5 \times 10^{20}$ ions/cc to $5 \times 10^{20}$ ions/cc.

18. The apparatus of claim 12 wherein said laser material comprises Nd3+ having concentrations substantially in the range of $0.5 \times 10^{20}$ ions/cc to $5 \times 10^{20}$ ions/cc.

19. The optical fiber of claim 1 wherein said laser material comprises Nd3+ having concentrations substantially in the range of $1 \times 10^{20}$ ions/cc to $5 \times 10^{20}$ ions/cc and Yb3+ having concentrations substantially in the range of $1 \times 10^{20}$ ions/cc to $10 \times 10^{20}$ ions/cc.

20. The optical fiber of claim 5 wherein said laser material comprises Nd3+ having concentrations substantially in the range of $1 \times 10^{20}$ ions/cc to $5 \times 10^{20}$ ions/cc and Yb3+ having concentrations substantially in the range of $1 \times 10^{20}$ ions/cc to $10 \times 10^{20}$ ions/cc.

21. The apparatus of claim 11 wherein said laser material comprises Nd3+ having concentrations substantially in the range of $1 \times 10^{20}$ ions/cc to $5 \times 10^{20}$ ions/cc and Yb3+ having concentrations substantially in the range of $1 \times 10^{20}$ ions/cc to $10 \times 10^{20}$ ions/cc.

22. The apparatus of claim 12 wherein said laser material comprises Nd3+ having concentrations substantially in the range of $1 \times 10^{20}$ ions/cc to $5 \times 10^{20}$ ions/cc and Yb3+ having concentrations substantially in the range of $1 \times 10^{20}$ ions/cc to $10 \times 10^{20}$ ions/cc.

23. The optical fiber of claim 1 wherein said laser material comprises Yb3+ having concentrations substantially in the range of $3 \times 10^{20}$ ions/cc to $20 \times 10^{20}$ ions/cc and Er3³ having concentrations substantially in the range of $0.1 \times 10^{20}$ ions/cc to $2 \times 10^{20}$ ions/cc.

24. The optical fiber of claim 5 wherein the laser material comprises Yb3+ having concentrations substantially in the range of $3 \times 10^{20}$ ions/cc to $20 \times 10^{20}$ ions/cc and Er3+ having concentrations substantially in the range of $0.1 \times 10^{20}$ ions/cc to $2 \times 10^{20}$ ions/cc.

25. The apparatus of claim 11 wherein said laser material comprises Yb3+ having concentrations substantially in the range of $3 \times 10^{20}$ ions/cc to $20 \times 10^{20}$ ions/cc and Er3+ having concentrations substantially in the range of $0.1 \times 10^{20}$ ions/cc to $2 \times 10^{20}$ ions/cc.

26. The apparatus of claim 12 wherein said laser material comprises Yb3+ having concentrations substantially in the range of $3 \times 10^{20}$ ions/cc to $20 \times 10^{20}$ ions/cc and Er3+ having concentrations substantially in the range of $0.1 \times 10^{20}$ ions/cc to $2 \times 10^{20}$ ions/cc.

27. An apparatus comprising:
 a first fiber which comprises a substantially single-mode core having an index of refraction $n_1$ comprised of laser material disposed within a multi-mode cladding having an index of refraction $n_2$ and a further cladding having an index of refraction $n_3$ surrounding said multi-mode cladding with substantially no space between said further cladding and said multi-mode cladding;
 wherein the cross-sectional area of said multi-mode cladding taken substantially transverse to the axial extent of the fiber has a first path across said area which passes substantially through the geometric center thereof whose length is substantially different from the length of a second path across said area which passes substantially through the geometric center thereof, said second path being substantially perpendicular to said first path said further cladding does not completely surround said multi=mode cladding along a portion of the axial extend of said first fiber, and $n_1 > n_2 > n_3$; and a second fiber which comprises a multi-mode waveguide and another further cladding surrounding said multi-mode waveguide with substantially no space between said further cladding and said multi-mode waveguide;
 wherein the cross-sectional area of said multi-mode waveguide taken substantially transverse to the axial extent of the fiber has a first path across said area which passes substantially through the geometric center thereof whose length is substantially different from the length of a second path across said area which passes substantially through the geometric center thereof, said second path being substantially perpendicular to said first path, and one end of said second fiber is formed into a wedge; and
 said multi-mode cladding is affixed to the wedge at the end of said waveguide along said portion of the first fiber.

28. The apparatus of claim 27 wherein the laser material comprises Nd3+ having concentrations substantially in the range of $0.5 \times 10^{20}$ ions/cc to $5 \times 10^{20}$ ions/cc.

29. The apparatus of claim 27 wherein the laser material comprises Nd³+ having concentrations substantially in the range of $1 \times 10^{20}$ ions/cc to $5 \times 10^{20}$ ions/cc and Yb3+ having concentrations substantially in the range of $1 \times 10^{20}$ ions/cc to $10 \times 10^{20}$ ions/cc 30. The apparatus of claim 27 wherein the laser material comprises Yb3+ having concentrations substantially in the range of $3 \times 10^{20}$ ions/cc to $20 \times 10^{20}$ ions/cc and Er3+ having concentrations substantially in the range of $0.1 \times 10^{20}$ ions/cc to $2 \times 10^{20}$ ions/cc.

31. The apparatus of claim 11 further comprising a reflector disposed at the end of the waveguide.

* * * * *